Patented Aug. 8, 1939

2,168,576

UNITED STATES PATENT OFFICE 2,168,576

PROCESS OF COLORING PLASTIC MASSES

Georg Niemann and Leo Kollek, Ludwigshafen-on-the-Rhine, Germany, assignors to General Aniline Works, Inc., New York, N. Y., a corporation of Delaware No Drawing. Application November 29, 1935, Serial No. 52,210. In Germany December 1, 1934

5 Claims. (Cl. 18—50)

The present invention relates to a process of coloring plastic masses.

It is already known that coatings and plastic masses prepared from chlorinated rubber, polymerized vinyl chloride, polymerized styrene, cellulose ethers, as for example alkyl or benzyl cellulose and the like, are extremely stable to the action of a great variety of chemicals. For the coloring of such products which are to be exposed to the continuous action of strong chemicals or of plastic masses, which are subjected in a further treatment to an energetic process, such as rubber (vulcanizing), casein, urea, or phenolic resins (hardening, moulding), it is obvious that only such dyestuffs can be employed as are not themselves destroyed by the chemicals concerned or the said treatments and which retain their color unchanged. The organic dyestuffs in general use and also the usual inorganic pigments containing metals, such as cadmium, lead and chromium colors and ultramarine, have in many cases an insufficient stability for the said purpose.

With the small number of inorganic pigments which satisfy the said requirements as regards stability to energetic chemical influences, such as carbon black, slate meal or graphite, it is only possible, however, to obtain grey to black colorations of but slight brilliance. Furthermore, these coloring pigments have to a varying extent the disadvantage that in order to obtain sufficiently deep colors, very large amounts thereof must be added so that an unfavorable influence on the strength properties of the lacquers, coating agents or plastic masses takes place.

We have now found that lacquers, coating agents, plastic masses, especially those which are subjected in a further treatment to an energetic process, such as rubber and the aforesaid resinous condensation products, can be colored very fast vigorous and brilliant shades by employing as dyestuffs products obtained by heating derivatives of phthalic acid or naphthalene ortho-dicarboxylic acids which have been formed by the combination of nitrogen with the carbon atoms of the two adjacent carboxylic groups, or their substitution products preferably in the presence of metals or metal compounds (see for example R. P. Linstead, Journal of the Chemical Society, page 1016 et seq. (1934)) which are also known as "phthalocyanines".

As derivatives of ortho-dicarboxylic acids of the said kind may be mentioned for example phthalamide, ortho-cyanobenzamide, phthalodinitrile, 3,4-dimethylphthalodinitrile or naphthalene ortho-dicarboxylic acid dinitriles. These compounds may be obtained for example by causing ammonia to act at elevated temperatures on phthalic acid or naphthalene ortho-dicarboxylic acids or the like. Ortho-phthalo- or naphthalene-ortho-dicarboxylic acid dinitriles may also be obtained by the reaction of ortho-dibrombenzene or -naphthalene or their derivatives with cuprous cyanide.

The aforesaid colored compounds are distinguished by very desirable properties, in particular by their stability to vulcanization and their insolubility in plastic masses both in the form of their complex metal compounds and in a form free from metal. They color rubber, for example, very beautiful greenish to pure blue shades of good properties as regards fastness.

The colorations produced while employing the said dyestuffs have also an excellent stability to the action of chemicals of a great variety of kinds, such as concentrated hydrochloric acid, sulphuric acid, caustic alkali solutions, ammonia solutions, lime liquors, soda solutions, soap solutions, chloride of lime liquors and alkali sulphide liquors.

By coloring the plastic masses which are specially resistant to the action of chemicals and which are hereinbefore mentioned with the said dyestuffs it is thus possible to prepare colored lacquers, coating agents, coatings and shaped articles having very fast shades of extreme purity, durability and brilliance of color which may be exposed to the continuous action of strong chemicals without suffering injury. The coloration of the masses may be effected by the usual methods.

The dyestuffs may be employed in pure form or in admixture with suitable substrata, white pigments or the like.

The following examples will further illustrate how the said invention may be carried out in practice but the invention is not restricted to these examples. The parts are by weight.

Example 1

25 parts of chlorinated rubber, after the addition of 12 parts of a chlorinated diphenyl acting as a softening agent, are dissolved in 63 parts of xylene. This solution is colored with 20 parts of a color lake which has been obtained by grinding 80 parts of heavy spar, 20 parts of titanium dioxide and 4 parts of a dyestuff obtained by heating phthalodinitrile with copper powder or cuprous chloride at 200° C. in the usual manner, as for example by trituration in a funnel mill. A lacquer is obtained which yields coatings of brilliant blue color and an excellent stability to chemical action. The lacquer thus colored is eminently suitable for coating articles which are to be exposed to the attack of strong acids, salt solutions, chloride of lime or alkali sulphide liquors. The color of the coating is not changed in any way by the action of the said chemicals.

Example 2

20 parts of a polymerization product of vinyl chloride together with 13.5 parts of a chlorinated diphenyl acting as a softening agent are dissolved in 67.5 parts of a solvent mixture consisting of equal amounts of butyl acetate and toluene. This solution is colored with 20 parts of the color lake specified in Example 1 by trituration in a funnel mill. In this manner a coating agent of a brilliant blue color and excellent stability to concentrated alkaline liquors is obtained.

Other plastic masses which are stable to chemical influences, as for example polymerized styrene or cellulose ethers, may be worked up with the said dyestuffs to give colored coatings which are highly resistant to chemical action.

Example 3

100 parts of a usual rubber mixture are mixed with 1 part of a color paste which has been prepared by triturating 66 parts of factice with 34 parts of a coloring matter obtained by heating phthalodinitrile with copper powder at about 200° C. The mixture is then vulcanized at 140° C. A brilliant blue vulcanization product is obtained which does not bleed.

Example 4

100 parts of a rubber mixture containing sulphur, a vulcanizing accelerator, titanium dioxide and calcium carbonate are mixed with 2 parts of a color paste which has been prepared by intimately mixing the blue pigment dye obtainable by heating phthalodinitrile in the presence of a solvent, with factice. The mixture is then vulcanized at about 140° C. A very fast vulcanization product having a green-blue coloration is obtained.

Example 5

100 parts of a usual rubber mixture are thoroughly mixed with 1 part of a pigment which can be obtained by treating 3-chlor-phthalodinitrile with sodium amylate. After vulcanizing a product is obtained which has a brilliant green-blue coloration of excellent fastness properties.

Example 6

40 parts of casein are plasticized with an aqueous suspension of 4 parts of sodium bicarbonate. The mass thus obtained is then mixed while kneading with 20 parts of a dye pigment which has been prepared from phthalodinitrile in the presence of copper salts. The plastic mass thus colored is then treated on suitable rollers and the thin sheets thus obtained are dried and ground. Aqueous suspensions of the mass thus colored can be readily employed for coloring leather or for the production of shaped articles which do not change in color when treated with formaldehyde.

What we claim is:

1. Vulcanized rubber colored with copper phthalocyanine.
2. Vulcanized rubber colored with a phthalocyanine coloring matter.
3. Vulcanized rubber colored with metal-free phthalocyanine.
4. Vulcanized rubber colored with a halogenated phthalocyanine.
5. Vulcanized rubber colored with a chlorinated phthalocyanine.

GEORG NIEMANN.
LEO KOLLEK.